(12) United States Patent
Horng et al.

(10) Patent No.: US 7,263,132 B2
(45) Date of Patent: Aug. 28, 2007

(54) ADAPTIVE SPACE-TIME TRANSMIT DIVERSITY CODING FOR MIMO SYSTEMS

(75) Inventors: Jyhchau Horng, Warren, NJ (US); Ling Li, New Providence, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 694 days.

(21) Appl. No.: 10/285,269

(22) Filed: Oct. 31, 2002

(65) Prior Publication Data

US 2004/0033782 A1 Feb. 19, 2004

Related U.S. Application Data

(63) Continuation-in-part of application No. 10/217,919, filed on Aug. 13, 2002.

(51) Int. Cl.
*H04B 7/02* (2006.01)
(52) U.S. Cl. .................... 375/267; 375/299; 375/347
(58) Field of Classification Search ............ 375/267, 375/259, 260, 295, 296, 297, 299, 316, 346, 375/347, 349, 354, 358
See application file for complete search history.

(56) References Cited

U.S. PATENT DOCUMENTS

| | | | | |
|---|---|---|---|---|
| 6,144,711 A | * | 11/2000 | Raleigh et al. | ............ 375/347 |
| 6,256,290 B1 | * | 7/2001 | Ramesh | ...................... 370/204 |
| 7,181,246 B2 | * | 2/2007 | Lo | ........................... 455/562.1 |
| 2003/0063654 A1 | * | 4/2003 | Onggosanusi et al. | ...... 375/130 |
| 2003/0210750 A1 | * | 11/2003 | Onggosanusi et al. | ...... 375/295 |

OTHER PUBLICATIONS

Huawei, "STTD with Adaptive Transmitted Power Allocation," 3GPP TSG-R WG1 document, TSGR1#26 R1-02-0711, Gyeongju, Korea May 13-16, 2002.*
Alamouti, "*A simple transmit diversity technique for wireless communications*," IEEE J. Select. Areas Commun., 16:1451-1468, 1998.
Huawei "*STTD with Adaptive Transmitted Power Allocation*," 3GPP TSG-R WG1 document, TSGR1#26 R1-02-0711, Gyeongju, Korea May 13-16, 2002.
Derryberry et al., "*Transmit Diversity in 3G CDMA Systems*," IEEE Comm. Magazine, vol. 40, No. 4, pp. 68-75, Apr. 2002.

* cited by examiner

*Primary Examiner*—Jay K. Patel
*Assistant Examiner*—Naheed Ejaz
(74) *Attorney, Agent, or Firm*—Dirk Brinkman; Clifton D. Mueller; Gere V. Vinokur

(57) ABSTRACT

A method for transmitting a stream of data symbols in a multiple-input/multiple-output (MIMO) wireless communications system including $N_t$ transmitting antennas. The stream of data symbols is first demultiplexed into M sub-streams, where $M=N_t/2$. Then, space-time transmit diversity encoding is applied to each sub-stream to generate a pair of transmit signals. Power is allocated dynamically to each transmit signal of each pair of transmit signals according to a corresponding feedback signal received from a receiver of the transmit signal. The feedback signal including a ratio of magnitude sums of channel coefficients for channels used for the transmit signals.

2 Claims, 2 Drawing Sheets

ADAPTIVE SPACE-TIME TRANSMIT DIVERSITY CODING FOR MIMO SYSTEMS

RELATED APPLICATION

This is a continuation-in-part application of U.S. patent application Ser. No. 10/217,919 "MIMO Systems with STTD Encoding and Dynamic Power Allocation," filed by Horng et al., on Aug. 13, 2002.

FIELD OF THE INVENTION

The invention relates generally to wireless communications, and more particularly to multiple input/multiple output wireless communications systems with dynamic power allocation.

BACKGROUND OF THE INVENTION

Transmit diversity is one of the key technologies used in third generation (3G) wireless communications systems. By transmitting the signal through multiple transmit antennas to multiple receive antennas spatial diversity gains can be achieved to enhance the system capacity. Space-time transmit diversity (STTD) is an open loop technique in which the symbols are modulated using space-time block code, see Alamouti, "A simple transmit diversity technique for wireless communications," IEEE J. Select. Areas Commun., 16:1451-1468, 1998.

The STTD scheme is adopted by 3GPP due to its simple implementation and maximal diversity gains. Transmit adaptive array (TXAA) is a closed loop transmit diversity technique adopted by 3GPP. The mobile receiver feedbacks the estimated optimal transmit weights to the basestation. The base station uses this feedback information to adjust the power level of the transmitted signal so that the received power at the desired mobile receiver is maximized.

Simulation results show that the STTD is robust at higher velocities, while TXAA provides the biggest benefits at lower velocities, see Derryberry et al., "Transmit Diversity in 3G CDMA Systems," IEEE Comm. Magazine, vol.40, no.4, pp. 68-75, April 2002.

A mixture of open and closed loop diversity technique could be used to combat both fast and slow fading. Recently, an adaptive STTD (ASTTD) scheme has been described, which combines STTD with adaptive transmit power allocation in order to improve the performances of the STTD systems, see Huawei "STTD with Adaptive Transmitted Power Allocation," 3GPP TSG-R WG1 document, TSG-R1#26 R1-02-0711, Gyeongju, Korea May 13-16, 2002.

SUMMARY OF THE INVENTION

A method for transmitting a stream of data symbols in a multiple-input/multiple-output (MIMO) wireless communications system including $N_t$ transmitting antennas.

The stream of data symbols is first demultiplexed into M sub-streams, where $M=N_t/2$. Then, space-time transmit diversity encoding is applied to each sub-stream to generate a pair of transmit signals.

Power is allocated dynamically to each one of the pairs of transmitted signal according to a corresponding feedback signal received from a receiver of the transmit signal. The feedback signal including a ratio of magnitude sums of channel coefficients for channels used for the transmitted signals.

DETAILED DESCRIPTION OF THE PREFERRED EMBODIMENT

Figure 1:
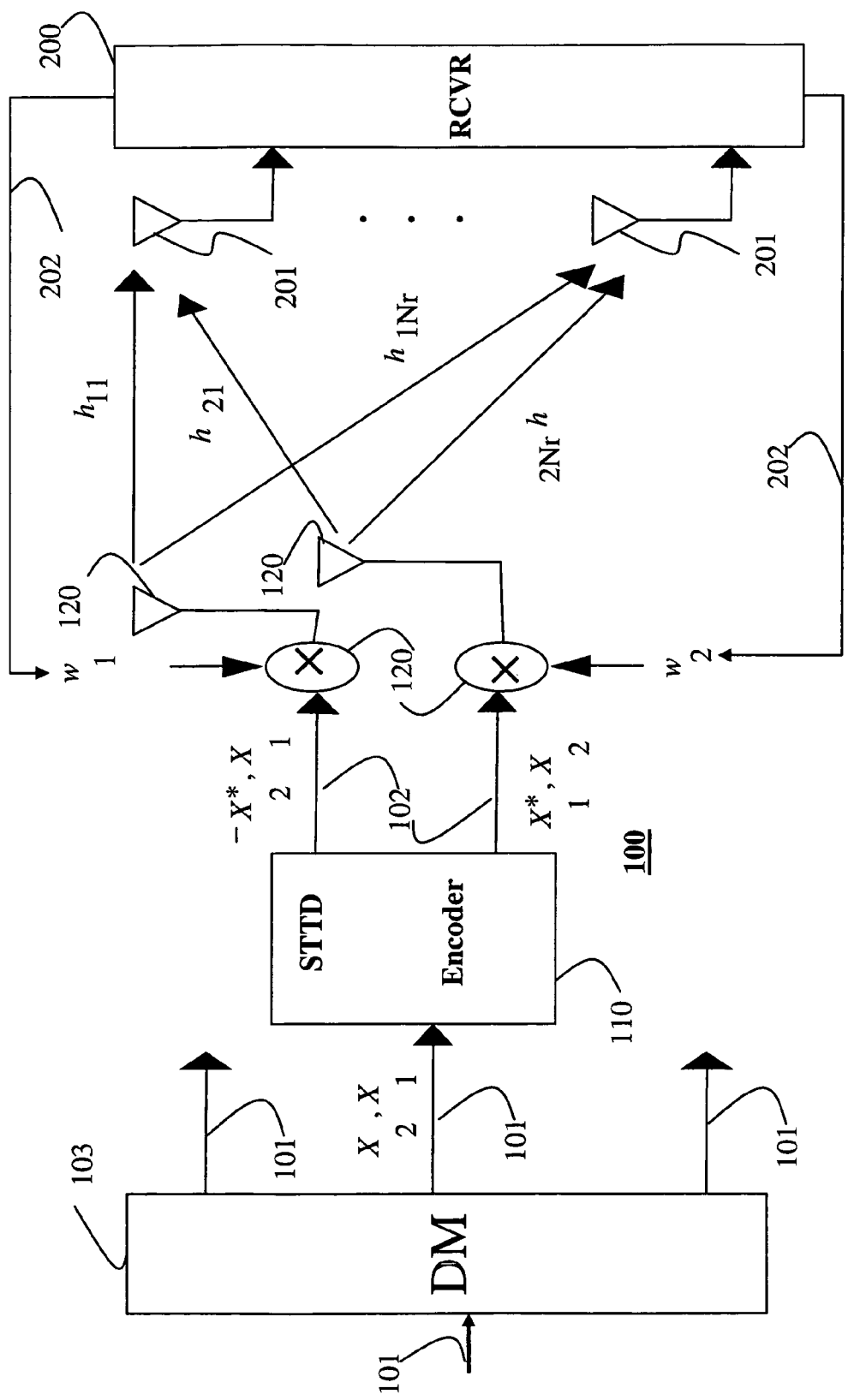
FIG. 1 is a block diagram of a multiple input/multiple output wireless communications systems that uses the invention.

FIG. 1 shows a MIMO system 100 that can use the invention. From a single input signal 101, an STTD encoder 110 produces multiple output signals 102 using demultiplexing 103. The power of each of the output signals is weighted 120 by a power amplifier before sent to multiple transmitter antennas 120 through channels having responses h to receiver antennas 201 of a receiver 200, see FIG. 2.

The weights, $w_1$, and $w_2$, are real positive numbers which are selected to maximize the SNR at the receiver 200 with the constraint that $w_1^2+w_2^2=1$. The STTD encoding 110 is a space-time block code which encodes the input signal $[X_1\ X_2]^T$ 101 into output signals 102

$$\begin{bmatrix} X_1 & -X_2^* \\ X_2 & X_1^* \end{bmatrix}, \quad (1)$$

where * denotes complex conjugate and each row of the matrix is assigned to the same transmit antenna 120.

Figure 2:
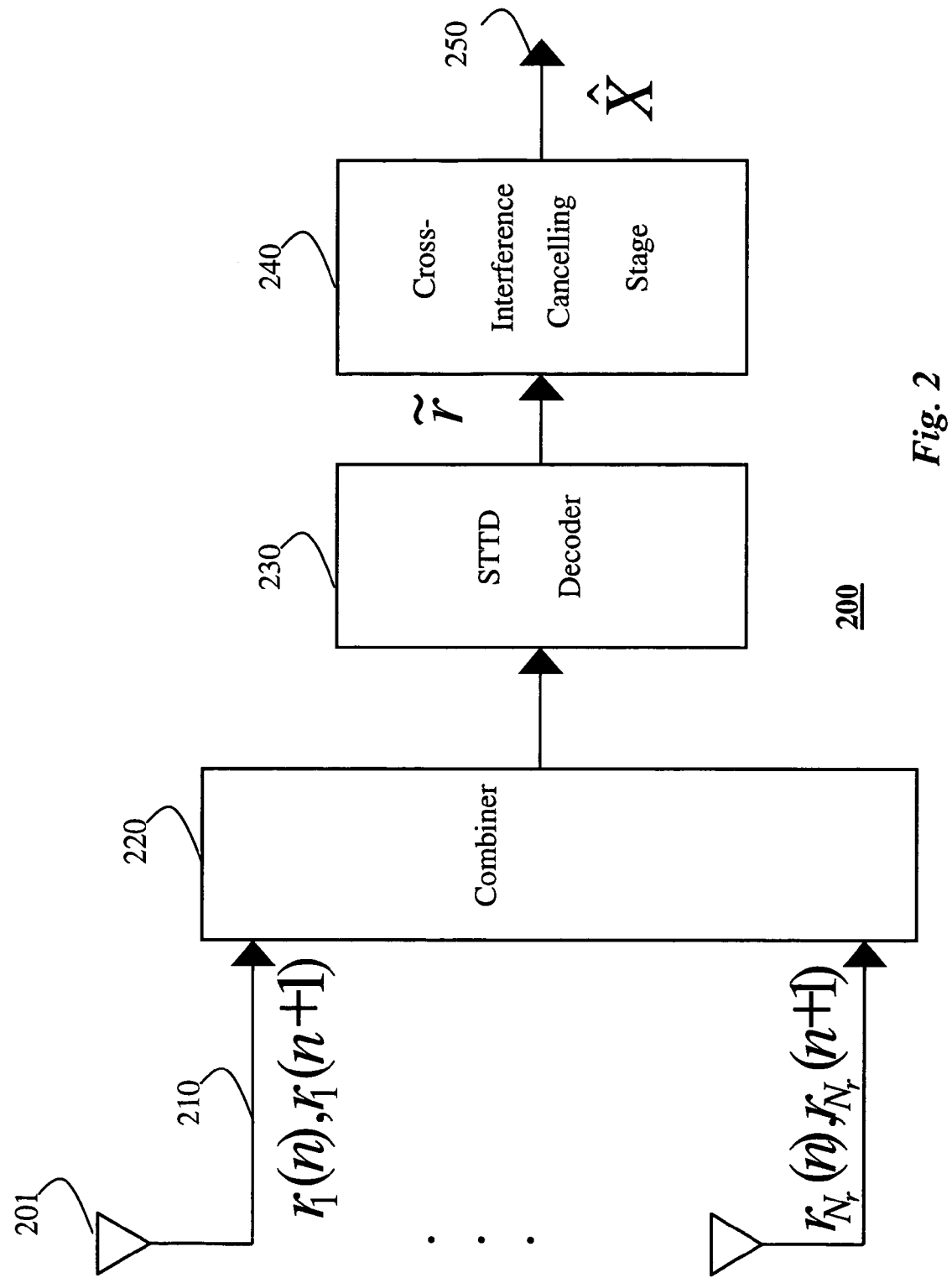
FIG. 2 is a block diagram of a receiver of the system of FIG. 1.

FIG. 2 show the receiver 200 in greater detail. The receiver includes a combiner 220, an STTD decoder 230, and an interference cancellation stage 240.

Assume there are Nr receiver antennas 201 at the receiver 200. A received signal $r_i(n)$ 210 at the ith receiver antenna can be expressed as $$\begin{bmatrix} r_1(n) \\ r_1^*(n+1) \\ r_2(n) \\ r_2^*(n+1) \\ \vdots \\ r_{N_r}(n) \\ r_{N_r}^*(n+1) \end{bmatrix} = \begin{bmatrix} w_1 h_{11} & w_2 h_{21} \\ w_2 h_{21}^* & -w_1 h_{11}^* \\ w_1 h_{12} & w_2 h_{22} \\ w_2 h_{22}^* & -w_1 h_{12}^* \\ \vdots & \vdots \\ w_1 h_{1N_r} & w_2 h_{2N_r} \\ w_2 h_{2N_r}^* & -w_1 h_{1N_r}^* \end{bmatrix} \begin{bmatrix} X_1 \\ X_2 \end{bmatrix} + \begin{bmatrix} v_1(n) \\ v_1^*(n+1) \\ v_2(n) \\ v_2^*(n+1) \\ \vdots \\ v_{N_r}(n) \\ v_{N_r}^*(n+1) \end{bmatrix}, \quad (2)$$

$$r(n) \qquad\qquad \tilde{H} \qquad\qquad X \qquad v(n)$$

where $h_{ij}$ are the channel coefficients of the channels between the $i^{th}$ transmitter antennas and the $j^{th}$ receiver antennas, and $v(n)$ is the additive white Gaussian noise sample at time instant n, which is assumed to be independent at all receiver antenna elements.

The received signals 210 from all antennas 201 are first combined 220 before passed to the STTD decoder 230.

Therefore, the output $\tilde{r}$ of the STTD decoder 230 corresponding to the two successive transmitted symbol in one space-time coding block is given by $$\tilde{r}(n) = \begin{bmatrix} \tilde{r}_1 \\ \tilde{r}_2 \end{bmatrix} = H^* r(n) \qquad (3)$$

$$= \begin{bmatrix} h_{11}^* & h_{21} & h_{12}^* & h_{22} & \cdots & h_{1N_r}^* & h_{2N_r} \\ h_{21}^* & -h_{11} & h_{22}^* & -h_{12} & \cdots & h_{2N_r}^* & -h_{1N_r} \end{bmatrix} r(n)$$

$$= H^* \tilde{H} X + H^* v(n) = \begin{bmatrix} A & B \\ -B^* & A \end{bmatrix} \begin{bmatrix} X_1 \\ X_2 \end{bmatrix} + \tilde{v}(n)$$

where $A = w_1 \sum_{i=1}^{N_r} |h_{1N_r}|^2 + w_2 \sum_{i=1}^{N_r} |h_{2N_r}|^2$, (4)

$$B = w_2 \sum_{i=1}^{N_r} h_{1N_r}^* h_{2N_r} - w_1 \sum_{i=1}^{N_r} h_{1N_r}^* h_{2N_r}$$

and $$\tilde{v}(n) = H^* v(n) = \begin{bmatrix} \sum_{i=1}^{N_r} h_{1i}^* v_i(n) + \sum_{i=1}^{N_r} h_{2i} v_i^*(n+1) \\ \sum_{i=1}^{N_r} h_{2i}^* v_i(n) + \sum_{i=1}^{N_r} h_{1i} v_i^*(n+1) \end{bmatrix} \qquad (5)$$

To cancel the cross-interference term B in Equation (4), the cross-interference cancellation stage 240 maximizes the SNR of the STTD decoded symbols. The output $\hat{X}$ 250 is given by $$\begin{bmatrix} \hat{X}_1 \\ \hat{X}_2 \end{bmatrix} = \begin{bmatrix} A & B \\ -B^* & A \end{bmatrix}^* \tilde{r}(n) \qquad (6)$$

$$= \begin{bmatrix} |A|^2 + |B|^2 & 0 \\ 0 & |A|^2 + |B|^2 \end{bmatrix} \begin{bmatrix} X_1 \\ X_2 \end{bmatrix} = \begin{bmatrix} A^* & -B \\ B^* & A \end{bmatrix} \tilde{v}(n)$$

Thus, the conditional SNR of the output signal can be obtained by $$SNR\,|_{h_{i,j}} = \frac{(|A|^2 + |B|^2) E_s}{\sigma_v^2 \sum_j \sum_i |h_{i,j}|^2}, \qquad (7)$$

where Es is the transmitted symbol energy and $\sigma_v^2$ is the additive white noise power.

Because the term A in Equation (4) contributes dominantly to the desired signal energy, one can maximize A instead of maximizing the SNR in Equation (7).

Thus, the optimum weight function is found by letting $dA/dw_1 = 0$ with the fixed power constraint, $w_1^2 + w_2^2 = 1$.

$$w_1 = \frac{1}{\sqrt{1 + \left(\frac{\sum_{j=1}^{N_r} |h_{2j}|^2}{\sum_{j=1}^{N_r} |h_{1j}|^2}\right)^2}} \quad w_2 = \frac{1}{\sqrt{1 + \left(\frac{\sum_{j=1}^{N_r} |h_{1j}|^2}{\sum_{j=1}^{N_r} |h_{2j}|^2}\right)^2}}. \qquad (8)$$

Equation 8 shows that just the ratio of the magnitude sum of the channel coefficients are sufficient for the transmitter to calculate the optimum transmit weight. This is much simpler than the prior art closed loop techniques (TXAA), which uses the amplitude and phase information of the propagation channels to calculate the transmit weights. It also leads to a reduced number of bits or more reliable transmission of feedback information 200 in our invention.

In there are no limits on the feedback size, then an eigen-mode can be used as an alternative to calculate transmit weights. The transmit weight vector is chosen as the principal eigenvector corresponding to a maximum eigenvalue of the channel correlation matrix R, where $$R = \hat{H}\hat{H}^H, \text{ and } \hat{H} = \begin{bmatrix} h_{11} & h_{12} & \cdots & h_{1N_r} \\ h_{21} & h_{22} & \cdots & h_{2N_r} \end{bmatrix}, \text{ for } j = 1, \ldots, N_r. \qquad (9)$$

The performance of the adaptive STTD can provide about a 0.8 dB SNR gain for a BER=$10^{-3}$, and a 1.0 dB gain for FER=$10^{-1}$. It should be noted that the invention can also be used for multiple transmit antennas and a single receive antenna.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for transmitting a stream of data symbols in a muitiple-input/multiple-output wireless communications system including $N_r$ transmitting antennas, comprising:
   demultiplexing the stream of data symbols into M substreams, where M=$N_r/2$;
   space-time transmit diversity encoding each sub-stream into a pair of transmit signals; and
   dynamically allocating power to each transmit signal of each pair according to a corresponding feedback signal received from a receiver, the feedback signal including a ratio of magnitude sums of channel coefficients for channels used for the transmit signal, and the power of the pair of transmit signals being respectively weighted by positive real numbers w$_1$ and w$_2$ $$w_1 = \frac{1}{\sqrt{1 + \left(\frac{\sum_{j=1}^{N_r} |h_{2j}|^2}{\sum_{j=1}^{N_r} |h_{1j}|^2}\right)^2}} \text{ and } w_2 = \frac{1}{\sqrt{1 + \left(\frac{\sum_{j=1}^{N_r} |h_{1j}|^2}{\sum_{j=1}^{N_r} |h_{2j}|^2}\right)^2}},$$

where $h_{ij}$ represent the channel coefficients for a channel between an $i^{th}$ transmitter antenna and a $j^{th}$ receiver antenna, where j is 1, ..., $N_r$.

2. A transmitter for a multiple-input/multiple-output wireless communications system including $N_t$ transmitting antennas, comprising:

a demultiplexer configured to output M sub-streams of a stream of data symbols, where $M=N_t/2$;

a space-time transmit diversity encoder configured to encode each sub-stream into a pair of transmit signals; and a power amplifier configured to dynamically allocate power to each transmit signal of each pair according to a corresponding feedback signal received from a receiver, the feedback signal including a ratio of magnitude sums of channel coefficients for channels used for the transmit signal, and the power of the pair of transmit signals being respectively weighted by positive real numbers $w_1$ and $w_2$, $$w_1 = \frac{1}{\sqrt{1+\left(\frac{\sum_{j=1}^{N_r}|h_{2,j}|^2}{\sum_{j=1}^{N_r}|h_{1,j}|^2}\right)^2}} \quad \text{and} \quad w_2 = \frac{1}{\sqrt{1+\left(\frac{\sum_{j=1}^{N_r}|h_{1,j}|^2}{\sum_{j=1}^{N_r}|h_{2,j}|^2}\right)^2}},$$

where $h_{ij}$ represent the channel coefficients for a channel between an $i^{th}$ transmitter antenna and a $j^{th}$ receiver antenna, where j is $1, \ldots, N_r$.

* * * * *